United States Patent

[11] 3,631,334

[72] Inventors Izrail Mordukhovich Pesis;
David Leonidovich Shvarts, both of
Kharkov, U.S.S.R.
[21] Appl. No. 843,568
[22] Filed July 22, 1969
[45] Patented Dec. 28, 1971
[73] Assignee Spetsialnoe Konstruktorskoe Bjuro Po
Electroburenjiu (SKBE)
Moscow, U.S.S.R.
[32] Priority July 19, 1968
[33] U.S.S.R.
[31] 1254002

[54] DEVICE FOR VOLTAGE STABILIZATION AT THE INPUT OF A POWER CONSUMER REMOTE FROM POWER SUPPLY SOURCE
3 Claims, 1 Drawing Fig.
[52] U.S. Cl. .................................................. 323/85, 330/8, 323/89 P
[51] Int. Cl. ...................................................... H02p 13/12, H03f 9/00
[50] Field of Search .......................................... 323/85, 87, 88, 89, 89 P, 89 M; 330/8

[56] References Cited
UNITED STATES PATENTS
2,780,770  2/1957  Lee .............................. 323/89
3,374,427  3/1968  Fenoglio et al. ............. 323/89 P Primary Examiner—Gerald Goldberg
Attorney—Waters, Roditi, Schwartz & Nissen ABSTRACT: A voltage stabilization device at the input of a power consumer remote from a power supply source comprises a plurality of controllable magnetic power amplifiers including respective working power windings phase connected to respective current supply leads between the supply source and consumer; a plurality of shunting circuits with respective ones of the plurality of shunting circuits being parallel connected to a respective power winding of each magnetic amplifier, the impedance of each shunting circuit being a minimum at no-load consumer operation with maximum internal impedance working winding compensating for the voltage drop across the respective current supply lead and a maximum when the consumer operates under load with a minimum resistance of the respective working winding of the amplifier.

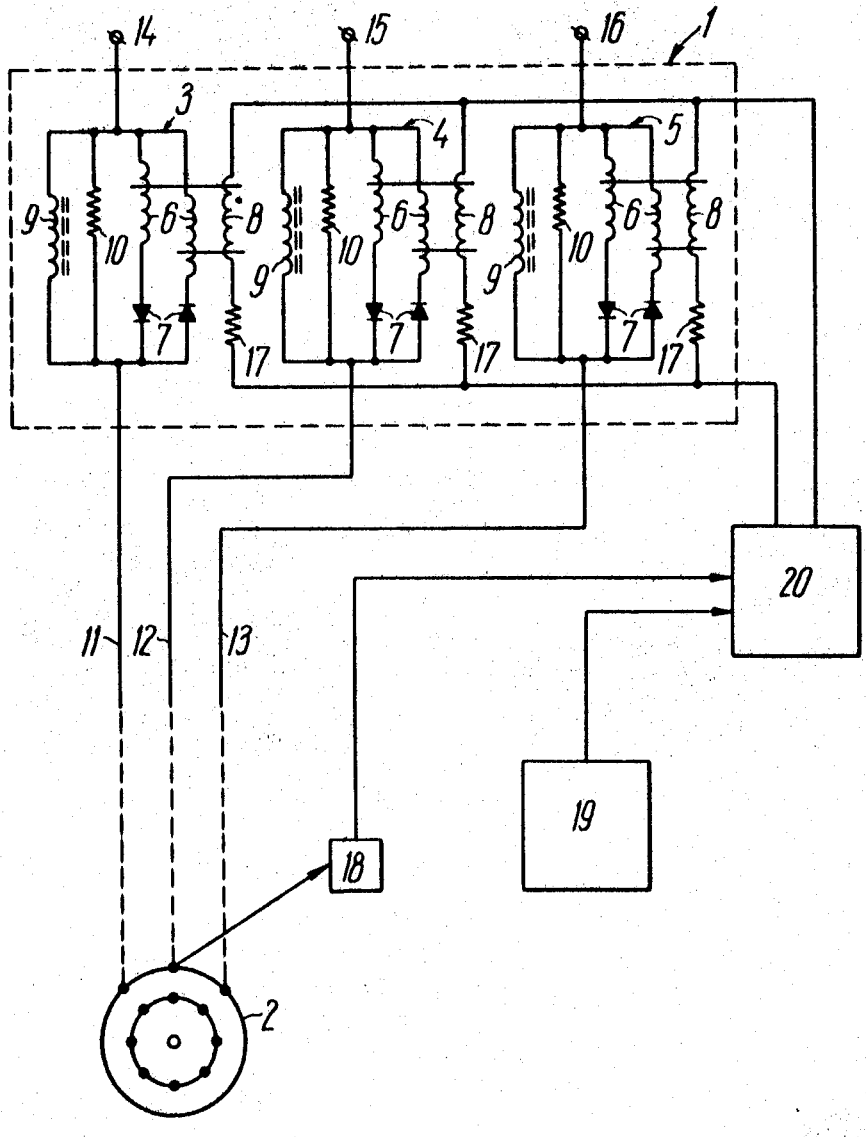

DEVICE FOR VOLTAGE STABILIZATION AT THE INPUT OF A POWER CONSUMER REMOTE FROM POWER SUPPLY SOURCE

The present invention relates to devices for voltage stabilization at the input of a power consumer remote from the power supply source and located at hard-of-access places, in particular, when the consumer such as electric motor, is located in a borehole or in a well. The invention can find its most effective application when employed for voltage stabilization across the terminals of a submersible motor of an electric drill.

It is desirable that a device for voltage stabilization across the terminals of a power consumer such as an electric motor operating in a well, be located on the ground close to the power supply source. A device now in common use comprises controlled self-saturating magnetic power amplifiers situated on the ground and connected to current supply wiring between the power supply source and the motor.

Said amplifiers are to compensate for voltage drop across the motor terminals due to load variation, or on account of a decreased voltage of the power supply source.

The operation of the magnetic amplifiers is controlled by a feedback system which incorporates a transducer of the voltage effective across the motor terminals. The variation of the transducer output signal results in the variation of the current flowing along the control windings of the magnetic amplifiers and, consequently, in a voltage dropping across said windings.

The power of the magnetic amplifiers in such devices depends upon the current passing through the amplifiers when the motor is operating and upon the range of variations of the voltage necessary to compensate for voltage drop across the motor terminals. More powerful magnetic amplifiers have increased size and, consequently, feature high control time constant and inadequate rate of response. Besides, the magnetic amplifiers are liable to substantially distort the true shape of the load current and voltage characteristics.

It is an object of the present invention to achieve higher rate of response of a voltage stabilization device.

It is another object of the present invention to reduce distortions of the current characteristics caused by the magnetic amplifiers.

Said and other objects of the present invention are accomplished due to the fact that in a device for voltage stabilization at the input of a power consumer remote from the power supply source, comprising controlled magnetic power amplifiers whose working power windings are phase-connected to the current supply leads communicating the power supply source and the power consumer, according to the invention a shunting circuit is connected in parallel with the power winding of each of the magnetic amplifiers, the impedance of said shunting circuit being so selected that the voltage drop across the latter at a maximum internal resistance of the working windings and a no-load consumer operation should be high enough to compensate for the voltage drop across the current supply leads with the consumer operating under load and at a minimum resistance of the working windings.

The herein-disclosed device being implemented as described above, with said device operating part of the electric energy consumed passes through the shunting circuit. As a result the current flowing through the working power windings of the magnetic amplifiers, is reduced due to which fact the size of the latter can be diminished and the rate of response to the device be correspondingly increased.

The shunting circuits can be composed of a resistor or a linear choke or of both connected in parallel with each other.

The use of resistors and linear chokes as the shunting elements, as it has been evidenced by the practice, proves to effective in reducing the shape distortions of the current and voltage characteristics caused by the magnetic amplifiers.

In what follows the present invention is exemplified by the description of a specific embodiment of a device for voltage stabilization across the terminals of a submersible electric motor of an electric drill, to be read in conjunction with the appended drawing, representing a schematic circuit diagram of the voltage stabilization device of the invention as connected to the motor.

Now referring to the drawing, a device 1 for voltage stabilization across the terminals of a submersible motor 2 of an electric drill (not shown in the drawing), comprises three single-phase self-saturating magnetic power amplifiers 3, 4 and 5. Each of the amplifiers has effective power windings 6 with inherent regeneration diodes 7, and control windings 8.

The working windings of each amplifier are shunted with an electric circuit formed by a linear choke 9 and a resistor 10 connected in parallel with each other. Said shunting circuits are parallel-connected with respect to the windings 6.

THe magnetic amplifiers 3, 4 and 5 are located on the ground and are connected to respective phases 11, 12, 13 of the current supply system between output terminals 14, 15 and 16 of the power supply source (not shown in the drawing) and the input terminals of the motor 2. Besides, the impedance of the shunting circuit "choke-resistor" is to be so selected that the voltage drop across the shunting circuit at a maximum internal resistance of the working windings and under no-load operation of the motor 2, be high enough to compensate for the voltage drop across the current supply wiring system with the motor running under load and at a minimum resistance of the working windings 6.

The windings 8 are connected via resistors 17 to the feedback system output, said feedback system incorporating a transducer 18 of the voltage across the input terminals of the motor 2, a reference voltage source 19 and a comparison circuit 20 with an amplifier, the output signal of said comparison circuit controlling the operation of the magnetic amplifiers.

The device in contemplation functions as follows.

With the motor 2 running under no load, the windings 6 feature their maximum resistance which accounts for the current to flow mostly through the choke 9 and the resistor 10, both offering substantially lower resistance than the windings 6 do. As the load on the motor 2 is raised the current passing through the supply wiring is increased while the voltage across the terminals of the motor 2 drops accordingly. Then the feedback system produces a signal which causes the current passing through the windings 8 to vary. As a result the internal resistance of the windings 6 starts decreasing until the voltage variation across the power winding 6 compensates for the voltage drop across the current supply wiring, only part of the whole working current necessary for feeding the motor 2 continuing to flow along the windings 6.

Under any operating conditions only part of the working current flows through the windings 6, whereby the size of the latter can be diminished.

The herein-disclosed invention makes it possible to reduce the size of the magnetic amplifiers approximately 1.5 to 2 times as compared to the conventional ones at the same time substantially increasing the rate of response of the entire device.

It should be noted that described herein is an optimum embodiment of the present invention where the shunting circuit is formed by a linear choke and a resistor. However, it is to be understood that the shunting circuit may likewise be formed either by a sloe resistor or by a sole linear choke.

What is claimed is:

1. A device foe voltage stabilization at the input of a power consumer remote from a power supply source, said power consumer receiving power on a plurality of current supply leads, comprising a plurality of controllable magnetic power amplifiers including respective working power windings phase-connected to respective current supply leads between said power supply source and the power consumer; a plurality of shunting circuits with respective ones of said plurality of said shunting circuits being parallel-connected to a respective power winding of each magnetic amplifier, the impedance of each shunting circuit being a minimum at no-load consumer operation with maximum internal resistance of the working winding compensating for voltage drop across the respective current supply lead and a maximum when the consumer operates under load with a minimum resistance of the respective working winding of the amplifier, wherein the shunting circuits include resistor means.

2. A device as claimed in claim 1, wherein the shunting circuit includes a linear choke means connected in parallel with said resistor means.

3. A device for voltage stabilization at the input of a power consumer remote from a power supply source, said power consumer receiving power on a plurality of current supply leads, comprising a plurality of controllable magnetic power amplifiers including respective working power windings phase-connected to respective current supply leads between said power supply source and the power consumer; a plurality of shunting circuits with respective ones of said plurality of said shunting circuits being parallel-connected to a respective power winding of each magnetic amplifier, the impedance of each shunting circuit being a minimum at no-load consumer operation with maximum internal resistance of the working winding compensating for the voltage drop across the respective current supply lead and a maximum when the consumer operates under load with a minimum resistance of the respective working winding of the amplifier, wherein the shunting circuits are formed by linear chokes.

* * * * *